Dec. 6, 1966 C. J. ELLERD 3,290,058
MODIFIED ARTICULATED VEHICLE
Filed Sept. 24, 1965 5 Sheets-Sheet 1
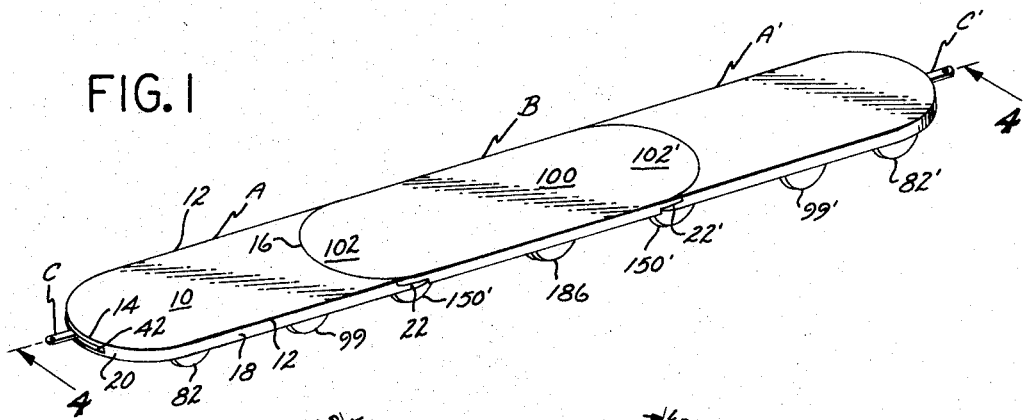
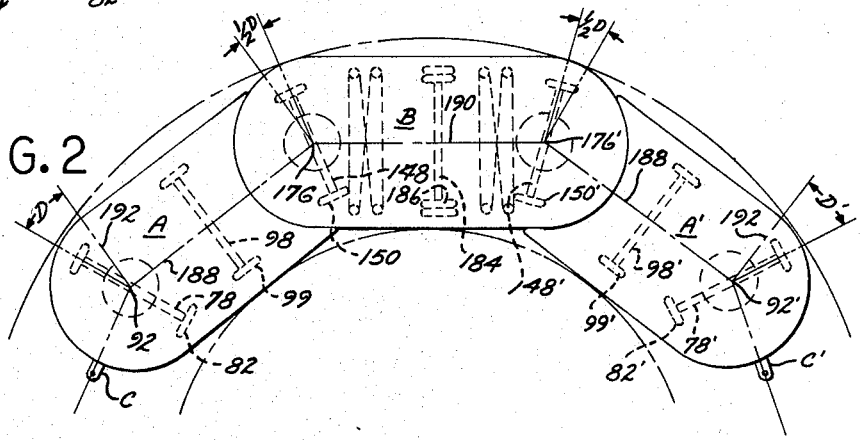
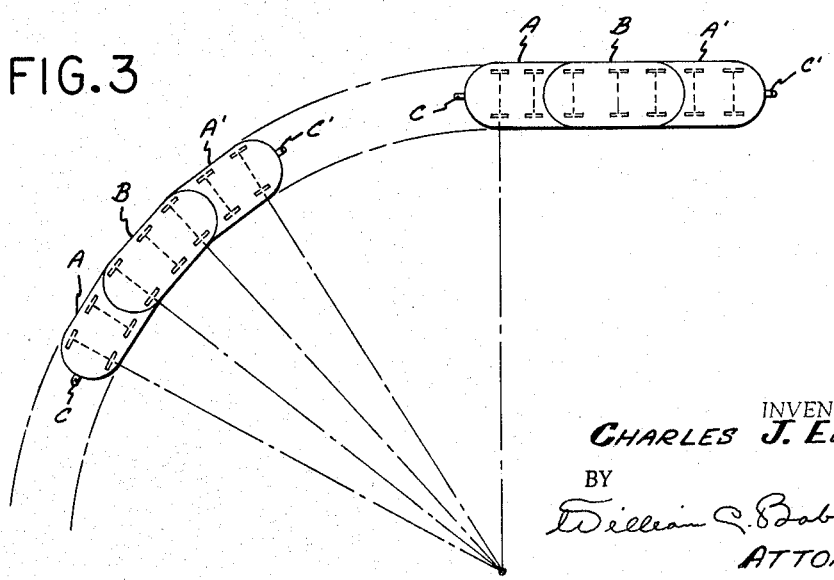
INVENTOR.
CHARLES J. ELLERD
BY
William C. Babcock
ATTORNEY Dec. 6, 1966 C. J. ELLERD 3,290,058
MODIFIED ARTICULATED VEHICLE
Filed Sept. 24, 1965 5 Sheets-Sheet 2

INVENTOR.
CHARLES J. ELLERD
BY
William C. Babcock
ATTORNEY

Dec. 6, 1966        C. J. ELLERD        3,290,058
MODIFIED ARTICULATED VEHICLE
Filed Sept. 24, 1965                5 Sheets-Sheet 3

INVENTOR.
CHARLES J. ELLERD
BY
William C. Babcock
ATTORNEY

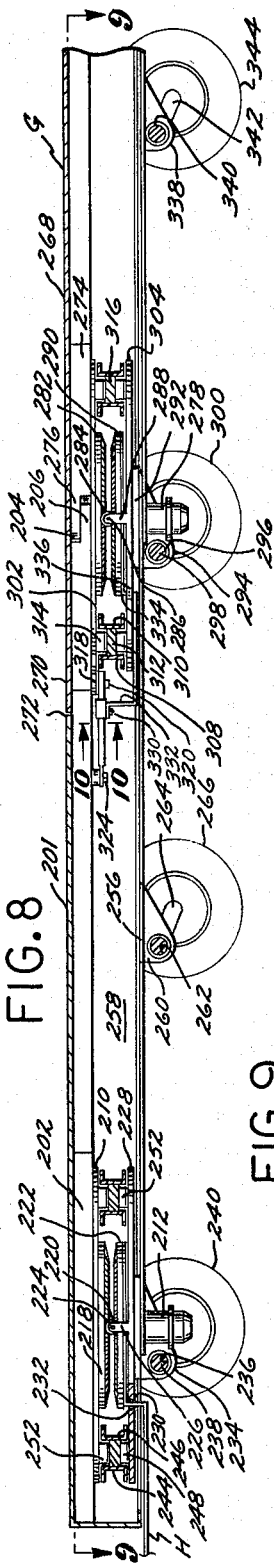

Dec. 6, 1966  C. J. ELLERD  3,290,058
MODIFIED ARTICULATED VEHICLE
Filed Sept. 24, 1965  5 Sheets-Sheet 5
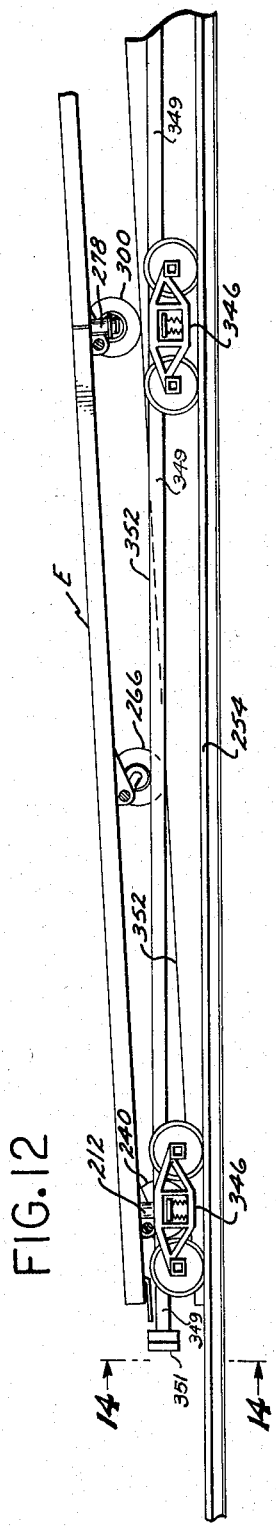
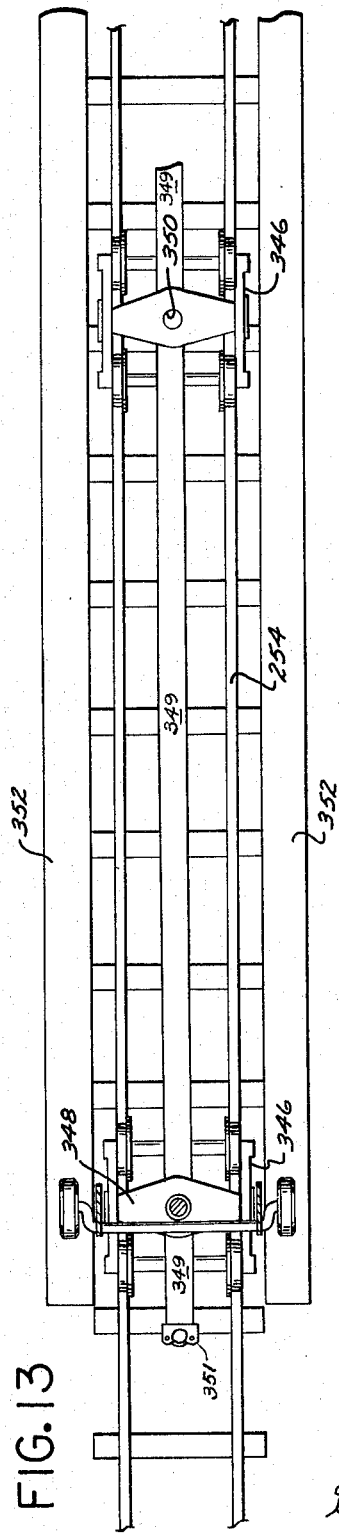
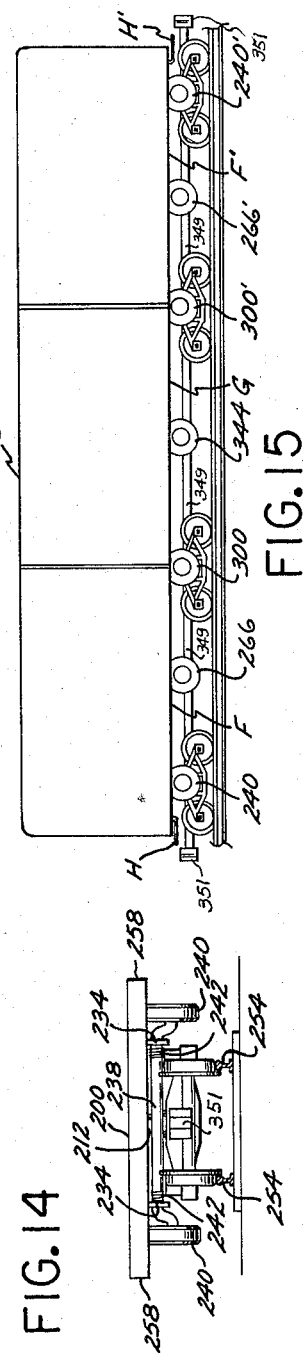
INVENTOR.
CHARLES J. ELLERD
BY
William C. Babcock
ATTORNEY

United States Patent Office 3,290,058
Patented Dec. 6, 1966

3,290,058
MODIFIED ARTICULATED VEHICLE
Charles J. Ellerd, 1669 Chester Ave., Bakersfield, Calif.
Filed Sept. 24, 1965, Ser. No. 490,034
11 Claims. (Cl. 280—410)

The present invention relates generally to cargo transportation, and more particularly to an articulated cargo vehicle that is adapted to be drawn either on the highway, over any relatively flat terrain, or can travel on a railway.

The present application is a continuation-in-part of my copending patent application Serial No. 430,721, filed February 5, 1965, entitled Articulated Cargo Vehicle.

A major object of the present invention is to provide an articulated vehicle, preferably comprising three wheel-supported sections which cooperatively provide a sectional elongate, horizontal supporting platform of constant length, which is relatively close to the ground for ease in loading and unloading cargo therefrom.

Another object of the invention is to supply an articulated vehicle that is adapted to be drawn equally well from either end thereof, may be self-propelled, if desired, and is adapted to travel over either a highway or on rails.

A still further object of the invention is to provide an articulated vehicle having a short turning radius and a high degree of maneuverability, and one in which the two sections trailing the lead section thereof are automatically steered to follow the lead section as it turns to permit the vehicle to negotiate narrow streets, alleys, lanes, or the like, with a maximum degree of safety.

A further object of the invention is to supply an articulated vehicle that may be quickly and easily mounted on railroad trucks to permit travel thereof over rails to a desired destination, and upon arrival may be conveniently separated from said trucks for travel over a highway.

Yet another object of the invention is to provide an articulated vehicle capable of carrying an upper enclosed body extending the length thereof, which body is adapted to be economically refrigerated for transport of perishable goods therein.

Still a further object of the invention is to furnish an articulated vehicle that includes a number of pivotally connected tow bar members extending the length thereof to absorb the tow bar pull and free the body of the vehicle from any stress or strain due to the pulling force exerted in moving the same.

A further object of the invention is to supply an articulated vehicle which can maintain an even distribution of laden weight, yet be effectively braked without disturbing the cargo borne thereby.

These and other objects and advantages of the invention will be apparent from the following description of a first and second form thereof, and from the accompanying drawings illustrating the same, in which:

FIGURE 1 is a perspective view of a first form of the articulated vehicle;

FIGURE 2 is a top plan view showing the manner in which the two wheel-supported sections trailing the lead section of the first form of the vehicle are automatically guided to follow the same when the lead section is pivoted to the left;

FIGURE 3 is a top plan view of the first form of the vehicle showing the manner in which the sections follow the lead section as they are moved out of coaxial alignment into one wherein they are in angular relationship;

FIGURE 4 is a longitudinal cross-sectional view of the first form of the vehicle, taken on the line 4—4 of FIGURE 1;

FIGURE 5 is a transverse cross-sectional view of the first form of the vehicle, taken on the line 5—5 of FIGURE 4;

FIGURE 8 is a longitudinal cross-sectional view of a second form of the invention;

FIGURE 9 is a horizontal cross-sectional view of the second form of the device shown in FIGURE 8, taken on the line 9—9 thereof;

FIGURE 10 is a fragmentary vertical cross-sectional view of the second form of the invention, taken on the line 10—10 of FIGURE 8;

FIGURE 11 is a fragmentary portion of the second form of the device illustrated in FIGURE 9, showing an end section thereof after it has been moved to an angular position relative to the intermediate section;

FIGURE 12 is a side elevational view of the second form of the invention shown partially supported on a ramp, with the end section to the left being removably supported on a railroad truck and with a second railroad truck so disposed as to engage a downwardly extending portion of this form of the vehicle as it is moved to the left on the ramp;

FIGURE 13 is a combined top plan view and horizontal cross-sectional view of the second form of the device shown in FIGURE 12;

FIGURE 14 is an end elevational view of the invention, taken on the line 14—14 of FIGURE 12; and FIGURE 15 is a side elevational view of the second form of the invention mounted on railroad trucks, with the two end sections and intermediate section each having an enclosed upper portion for the protection of cargo being transported thereon, which enclosures may be refrigerated if desired.

Figure 6:
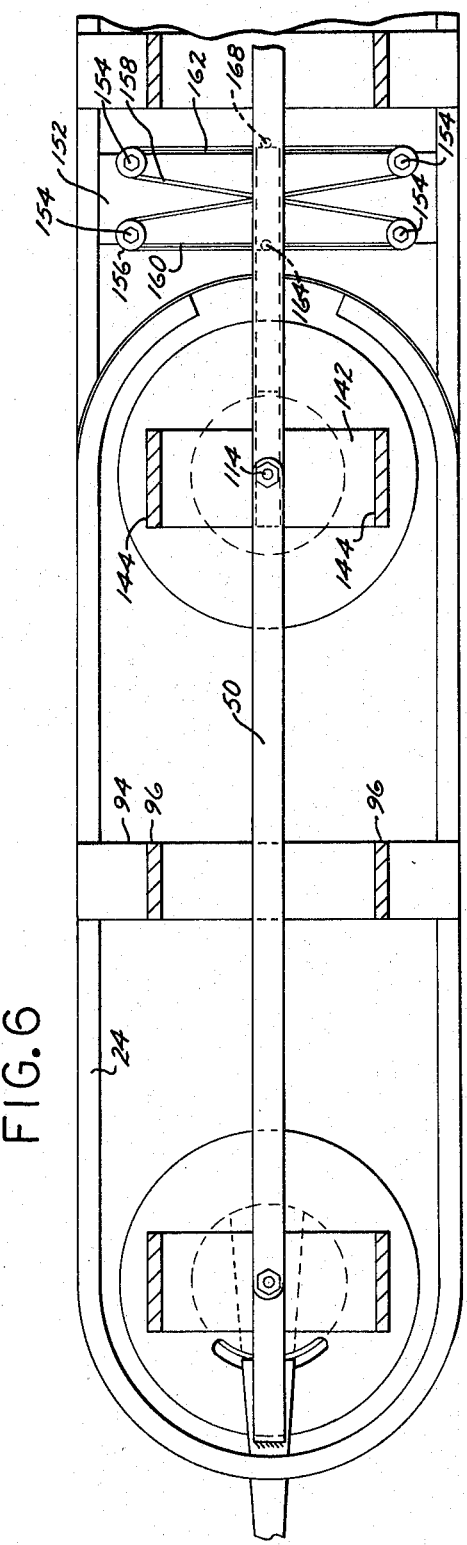
FIGURE 6 is a fragmentary bottom plan view of a portion of the first form of the vehicle, taken on the line 6—6 of FIGURE 4.

With continued reference to the drawings for the general arrangement of the first form of the invention, and FIGURES 1–7 inclusive in particular, it will be seen that the articulated vehicle includes first and second wheel-supported end sections A and A' which are pivotally connected to opposite ends of an intermediate wheel-supported section B. Tow bars C and C' project from the end sections A and A', and each of these tow bars is adapted to be used in drawing the vehicle in the direction in which it projects, whereby these two bars can be used for backing the vehicle if required.

The first and second end sections A and A' of the first form of the vehicle are structurally the same, and therefore a detailed description of only section A will be given herein. Those components of section A' corresponding to like components of section A are designated in the drawings by the same numerals used in section A but to which primes have been added.

The first section A, as can best be seen in FIGURES 1 and 4–6 inclusive, includes a flat horizontal load-supporting platform 10 having two laterally spaced side edges 12 that merge into a convex end edge 14 and a concave end edge 16. The two edges 12 develop into two vertical side walls 18 that are connected by a convex vertical end wall 20 depending from edges 14. At the extremity of the curved edge 16, the second walls 18 develop into a convex wall extension 22 which is substantially lower in height than the side walls 18 and end walls 20. A continuous horizontal flange 24 projects inwardly from the lower edges of the side walls 18, end wall 20, and a portion of extension 22. The upper extremity of the extension 22 is defined by a horizontal edge 26, as best shown in FIGURE 5.

A beveled gear 28 of substantial diameter is welded or otherwise rigidly secured to the under surface of section A (FIGURES 4 and 5). A heavy stud bolt 30 projects downwardly from the center of gear 28. Two diametrically opposed cone gears 32 engage the beveled gear 28, as may be seen in FIGURE 5. The cone gears 32 also engage a second beveled gear 34 that is rotatably mounted on the bolt 30. A heavy flat circular plate 36 is provided on which two uprights 38 are mounted which support horizontal shafts 40 that rotatably support the cone gears 32. Plate 36 is rotatably supported on bolt 30 and is also rotatably supported relative to gear 34 by a spacer 37 (FIGURE 5).

The tow bar C extends through a transverse slot 42 formed in the end wall 20, as best shown in FIGURES 1 and 4. An L-shaped extension 44 of tow bar C is welded or otherwise rigidly secured to the under surface of the second beveled gear 34. Extension 44 passes through an arcuate slot 45 formed in plate 36 as shown in FIGURES 4 and 6. By welding beads 46 the tow bar C is secured to a rigid member 48 in which a bore (not shown) is formed that pivotally engages the bolt 30.

A first tow bar member 50, best seen in FIGURE 4, has a first end portion 52 in which a bore (not shown) is formed that pivotally engages the bolt 30. The drag on the tow bar C is transmitted to the bolt 30 through the rigid member 48, and in turn this bolt transmits this force to the first tow bar member 50. Thus, the pull on the tow bar C is transmitted by the bolt 30 to the first tow bar member 50 without the section A being subjected to this force, and the platform 10 is accordingly subjected only to the weight of the cargo carried thereon.

An outer horizontal ring 54 and an inner horizontal ring 56 of smaller diameter are provided (FIGURE 5), and these rings are connected by a horizontal web 58. A number of rollers 60 rest on the upper surface of the web 58 which rotatably engage the under surface of the platform 10. Also, a number of rollers 62 are provided that engage the under surface of web 58 and rest on the upper surface of plate 36. The rollers 60 and 62, together with web 58 cooperatively serve to transmit the weight of the cargo (not shown) from the platform 10 to the plate 36 without subjecting the first and second beveled gears 28 and 34 and cone gears 32 to this weight. The rings 54 and 56 are preferably of channel-shaped transverse cross section, and together with the web 58, serve as an assembly to define races for rollers 60 and 62.

A number of guide members 64 project downwardly from the platform 10 (FIGURE 5) and serve to maintain the rings 54 and 56, web 58 and rollers 60 and 62 in a fixed position relative to the beveled gears 28 and 34. The lower end of bolt 30 is engaged by a washer 66 and nut 68. A transverse cross piece 70 is affixed to plate 36 by welding beads 72. The ends of cross piece 70 develop into two laterally spaced downwardly extending arms 74. Bores 76 are formed in arms 74 in which an axle 78 is disposed. The outer ends of axle 78 develop into two L-shaped portions 80 on which two pneumatic-tired wheels 82 are mounted.

Torsion springs 84 encircle axle 78, as can best be seen in FIGURE 5, and the ends 86 of these springs are rigidly secured to the axle 78, with the other ends 88 of the springs being secured to the arms 74. The longitudinal axis 90 of axle 78 is in vertical alignment with the center line 92 of the bolt 30. The end section A also includes a rigid transverse cross member 94, best shown in FIGURES 4 and 6, from which two arms 96 depend that serve to support an axle 98 that has wheels 99 rotatably supported thereon. Cross member 94 is rigidly secured to side walls 18 by welding or other conventional fastening means. The wheels 99 are in longitudinal alignment with the wheels 82. The structure of the axle 98 is the same as that of the axle 90, and a detailed description thereof need not be given.

The intermediate section B includes a platform 100 having two convex end portions 102 and 102' which overlie the wall extensions 22 and 22' of the wheel-supported end sections A and A'. Two walls 104 extend downwardly from the longitudinal edges 106 of the intermediate section B, and the lower ends thereof develop into walls 108 and 108' which do not extend downwardly from the curved edges 110 and 110' of the end portions 102 and 102' as low as do walls 104.

A beveled gear 112 of substantially the same size as gear 28 is welded or otherwise secured to the under surface of the platform end portion 102. A stud bolt 114 extends downwardly from the center of gear 112, as may be seen in FIGURE 6. A heavy circular plate 116 is provided, which is of substantially the same size and structure as plate 36, and a center bore (not shown) is formed in this plate that rotatably engages bolt 114.

Two diametrically opposed uprights 118 are affixed to plate 116, and a stub shaft 120 projects from each upright on which a cone gear 122 is rotatably supported. The gears 122 engage the beveled gear 112. The cone gears 122 also engage a second beveled gear 124 rotatably mounted on the bolt 114. The second beveled gear 124 is rotatably supported in a desired position above the plate 116 by a spacer 126. A bore (not shown) is formed in the right-hand end portion of the tow bar member 50 that engages the bolt 114 to transfer the pulling force from the tow bar C thereto. A second tow bar member 130 has a bore (not shown) formed in the left-hand end portion thereof, as can best be seen in FIGURE 4, and this bore engages the bolt 114, which serves to transfer pull from the tow bar member 50 to the tow bar member 130. It will be obvious that when the vehicle is being drawn by tow bar C', the situation is reversed, with the tow bar member 130 serving to transfer the pulling force through the bolt 114 to the tow bar member 50.

The intermediate section B also includes first and second concentrically disposed inner and outer rings 132 and 134 which are connected by a web 136. Rings 132 and 134 are preferably of channel-shaped transverse cross section, as best seen in FIGURE 4. A number of rollers 138 rest on the upper surfaces of the web 136 and engage the under surface of the platform end portion 102. Also, a number of rollers 140 rest on the upper surface of plate 116 and rotatably engage the under surface of web 136. The rollers 138 and 140, together with the web 136, cooperatively serve to transfer the weight of the cargo (not shown) on the platform 100 to the plate 116, without subjecting the cone gears 122 to any substantial portion of this weight.

The plate 116 rests on a cross piece 142, in which a bore (not shown) is formed that pivotally engages bolt 114. Two laterally spaced arms 144 depend from cross piece 142, and transversely aligned bores formed in these arms support a transverse axle 148 of the same shape and structure as that of axle 78. The outer ends of axle 148 rotatably support two pneumatically-tired wheels 150 which are in longitudinal alignment with wheels 99 and 82 when the vehicle is in the position shown in FIGURE 1.

A cross member 152 extends between the walls 104 of the intermediate section B (FIGURES 4 and 6) and is rigidly secured thereto by welding or other conventional fastening means. Four bolts 154 extend downwardly from cross member 152, each of which rotatably support a sprocket 156. The sprockets 156 (FIGURE 6) are engaged by a crossed-over endless chain belt 158 which includes two parallel, spaced reaches 160 and 162. A pin 164 extends downwardly from reach 160 to a rigid member 166 to which it is pivotally connected, cular plate 228 disposed below first plate 210. A central bore (not shown) is formed in plate 228 through which member 212 passes.

A tow bar H is provided that extends forwardly from platform 201, and this tow bar includes an upturned portion 230 that passes through an arcuate slot 232 formed in second plate 228. Portion 230 is rigidly secured to second gear 222. Two laterally spaced arms 234 depend from second plate 228. Transversely aligned bores 236 are formed in arms 234 situated forwardly of member 212, as illustrated in FIGURES 8 and 14. An axle 238 is mounted in bores 236. The end portions of axle 238 are L-shaped, and two pneumatic-tired wheels 240 are rotatably supported thereon. Two helical torsion springs 242 encircle axle 238 (FIGURE 14), with one end of each spring being affixed to one of the arms 234 and the other end to the axle 238.

An outer ring 244 and inner ring 246 are disposed between plates 210 and 228, and these rings are connected by a circular web 248. A number of rollers 250 rest on the upper surface of web 248 and engage the under surface of first plate 210. Also, a number of rollers 252 engage the under surface of web 248 and rest on the upper surface of second plate 228. The arms 234 are in laterally spaced relationship a distance apart greater than the spacing of two rails 254 on a standard railway track, for reasons which will hereinafter be explained.

A transverse cross piece 256 is connected to the lower edges of two side walls 258 that depend from the longitudinal edges of platform 201. Two arms 260 depend from cross piece 256 which are in longitudinal alignment with arms 234. Transversely aligned bores 262 are formed in arms 260 that support an axle 264 of the same structure as axle 238. Axle 264 rotatably supports two pneumatic-tired wheels 266 that are in longitudinal alignment with wheels 240.

The intermediate section G, as best shown in FIGURES 8 and 15, includes a platform 268 having two convex end portions 270, one of which is shown in FIGURE 8 disposed within the confines of a concave edge portion 272 of the platform 201. A longitudinally extending beam 274 is rigidly secured to the under side of platform 268, the forward end portion 276 of which is lower in height than the balance thereof and overlies the beam portion 204.

A rigid elongate cylindrical member 278 projects downwardly from the beam portion 276 and pivotally engages the opening 206. A number of reinforcing members 280 are associated with beam 274 that are of the same general configuration as that of the reinforcing members 208, and are rigidly secured to the under side of the platform 268, as can best be seen in FIGURE 9.

A beveled gear 282 is rigidly secured to the under side of a plate 302 by welding or other conventional means. A central opening (not shown) is formed in gear 282 through which the cylindrical member 278 projects downwardly. Two diametrically opposed cone gears 284 are rotatably supported on horizontal stub shafts 286 and engage gear 282, which shafts are supported from uprights 288. The cone gears 284 also engage a beveled gear 290 situated below the beveled gear 282.

A cross piece 292 is provided that supports two laterally spaced, downwardly extending arms 294 in which transversely aligned bores 296 are formed. Bores 296 pivotally support an axle 298 of the same structure as axle 238, with the outer ends of axle 298 rotatably supporting two pneumatic-tired wheels 300. Plate 302 is affixed to the under surface of the beam 274 and reinforcing members 280 by conventional fastening means.

A central opening (not shown) is formed in first plate 302 through which the member 278 projects downwardly. A circular plate 304 is disposed below plate 302, and rigidly supports the uprights 288. Plate 304 is pivotally movable relative to the downwardly projecting member 278, and plate 304 rests on the cross piece 292.

An outer ring 308 and an inner ring 310 extend around the gears 282 and 290, as best shown in FIGURE 8, and these two rings are connected by a ring-shaped web 312. A number of cylindrical rollers 314 are provided which are rotatably supported on the upper surface of web 312 and engage the under surface of plate 302. Also, a number of rollers 316 are provided that engage the under surface of web 312 and rest on the upper surface of plate 304.

An ear 318 projects outwardly from plate 302 (FIGURE 11), through which a bolt 320 extends to engage a bore (not shown) formed in an elongate rigid member 322 that is pivotally secured by a bolt 324 to the beam 202. A sleeve 326 provided with an anti-frictional liner 328 formed of brass, or the like, is longitudinally movably on member 322, as can best be seen in FIGURES 9 and 10. A bolt 330 projects downwardly from sleeve 326 which pivotally engages a rigid member 332 that depends downwardly and rearwardly from the sleeve, and an upturned end portion 334 of the member extends through an arcuate slot 336 formed in plate 304. The upper part of end portion 334 is secured to the beveled gear 290 by conventional means.

When the tow bar H is drawn forwardly and a sidewise force exerted thereon, the gear 222 is rotated, as are the cone gears 220 in engagement therewith. As gears 220 rotate they cause pivotal movement of plate 228 and the arms 234 depending therefrom, to pivot the axle 238 and wheels 240 relative to the platform 201.

When the second form E of the vehicle is moved forwardly and the wheels 240 thereof pivoted in the manner just described, the first section F of the device pivots on wheels 266. This pivotal movement of section F relative to the second section G causes the beam 202 to be angularly disposed relative to the beam 274, as shown in FIGURE 11. During this movement of beam 202, the member 322 is moved out of longitudinal alignment therewith to the angularly disposed position also shown in FIGURE 11. Thereafter sleeve 326 moves on member 322, and due to the connection of the rigid member 332 to the sleeve 326, the beveled gear 290 is rotated (FIGURE 11).

Movement of gear 290 causes rotation of the cone gears 284, and as these gears rotate relative to the fixed gear 282, the plate 304 is pivoted, together with the arms 294 depending therefrom, as well as axle 298 and the pneumatic-tired wheels 300 rotatably supported thereon. The pivotal movement of axle 298 and wheels 300 is one-half the angle made by axle 238 and wheels 240 rotatably supported thereon whereby wheels 266 and 300 may track as the second form E of the invention is moved forwardly in a curved path.

The second section G of the vehicle includes two laterally spaced, downwardly extending arms 338 in which bores 340 are formed to pivotally support a transverse axle 342 which rotatably supports pneumatic-tired wheels 344 on the outer ends thereof. When the wheels 300 are angularly disposed relative to the wheels 344, the second intermediate section G of the second form of the device pivots on the last mentioned wheels.

The second form E of the invention, as can best be seen in FIGURE 15, includes axle-supported wheels 300′, 266′ and 240′, that are supported from the intermediate section G and end section F′ in the same manner as the wheels 240, 266 and 300 are supported from the sections F and G. As this form of the device turns, the wheels 300′, 266′ and 240′ of the right-hand half thereof, are pivoted to track, with the wheels 240, 266, 300 and 344 by means of mechanisms of the same structure described in conjunction with the left-hand half thereof, as shown in FIGURE 8.

When it is desired to transport form E on the rails 254, a number of conventional car trucks 346 are provided that include cross pieces 348, in which centrally disposed sockets 350 are formed. The trucks 346 are pivotally connected to one another by heavy tow bar sections 349, by conventional means. Member 166 is welded or otherwise rigidly secured to the under surface of plate 116, as shown in FIGURE 4.

A pin 168 extends downwardly from reach 162 and is pivotally connected by conventional means to a second elongate rigid member 170 rigidly affixed to the cross piece 142 by welding, or the like. The ring 132 is held in a desired relationship relative to bolt 114 by a number of guide members 172 which depend from the under surface of the platform end portion 102 of the intermediate section B.

The longitudinal axis 174 of axle 148 and that of bolt 114 lie in the same vertical plane, as may be seen in FIGURE 4. The right-hand end of section B also shown in FIGURE 4, is identical structurally to the left-hand end previously described. The component parts of the right-hand end of section B are identified herein by the same numerals used in identifying like components of the left-hand end of the section, but to which primes have been added.

The intermediate section B also includes a transverse cross piece 178 that is rigidly secured by welding or otherwise to the lower edges of the walls 104 in a manner to place this cross piece in equal longitudinal spacing relative to the arms 144 and 144'. Two laterally spaced arms 180 depend from cross piece 178 in which bores 182 are formed that pivotally support an axle 184 similar to the axle 78. Axle 184 rotatably supports two pneumatically-tired wheels 186 on the outer ends thereof that are in longitudinal alignment with wheels 82, 99 and 150 when the vehicle is disposed as shown in FIGURE 1.

The support for the wheels 186 is the same as that for the wheels 99, and a detailed description thereof need not be repeated. Also the structure of the end section A' is identical to end section A, and the same numerals used in identifying components of section A are employed in identifying like components in section A', but to which a prime has been added.

The use and operation of the first form of the invention are relatively simple. As shown in FIGURE 2, the vertical center lines 92, 176, 176' and 92' are connected by three longitudinally extending center lines 188, 190 and 188'. It has been found that when the axles 78 and 78' are disposed at equal angles D and D' relative to the center lines 188 and 188', and the axles 148 and 148', and 174 and 174' are at angles ½D and ½D' relative thereto, the wheels 82, 99, 150, 186, 150', 99' and 82' will track when the first form of the vehicle is drawn by the tow bars C or C', irrespective of the configuration assumed by the device.

When the first form of the invention is drawn forwardly by the tow bar C, and a sidewise or lateral force exerted on the tow bar, the axle 78 will pivot to an angle D relative to a normal 192 extending from the center line 188. This pivotal movement of axle 78 is effected by rotation of the cone gears 32 by gear 34. The cone gears 32 rotate relative to the stationary gear 28, and in so doing move plate 36 and arms 74 relative to the platform 10 whereby the axle 78 is disposed at the angle D. This turning of axle 78 causes the first section A to pivot on the wheels 99, and the beveled gear 124 to move relative to the cone gears 122 to rotate the same, as may be seen in FIGURE 4. Gear 124 is held in a stationary position relative to wall extension 22 by a bracket 125 that extends through an arcuate slot 127 in plate 116.

Figure 7:
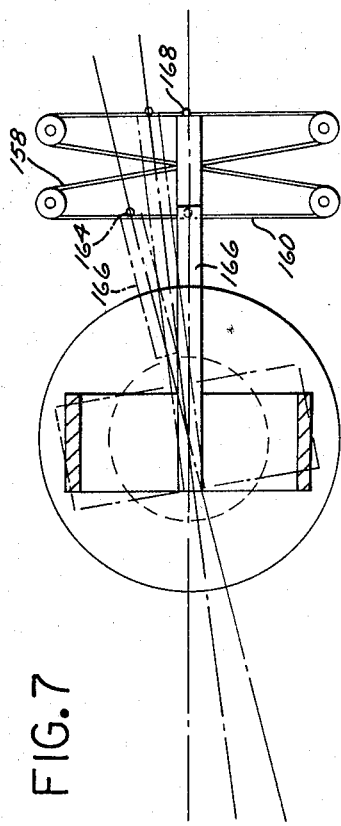
FIGURE 7 is a fragmentary bottom plan view of that portion of the first form of the invention shown on the right-hand end of FIGURE 6, illustrating the manner in which one pair of pivotally supported wheels is turned as an end section is drawn forward, and concurrently turned relative to the intermediate section.

Rotation of cone gears 122 causes rotation of the plate 116, which movement is transmitted through the rigid member 166 and pin 164 to move reach 160 to in turn move the belt 158, as shown in FIGURE 7. Movement of belt 158 also results in movement of the reach 162, together with the pin 168. Movement of pin 168 results in pivotal movement of the elongated member 170, cross piece 142, arms 144, axle 148 and wheels 150. The length of the members 166 and 170 is so selected that when the reach 162 moves, due to movement of reach 160, cross piece 142 and arms 144, the transverse axle 148 is pivoted through only an angle of ½D, as shown in FIGURE 2. As the position of the transverse axle 148 is altered, intermediate section B tends to pivot on the wheels 186 whereby the gear 124' moves relative to the cone gears 122', as illustrated in FIGURE 4. Rotation of cone gears 122' results in rotation of plate 116'. Pivotal movement of plate 116' causes the rigid member 166' to actuate belt 158'. As belt 158' moves, the member 170' and cross piece 142' are pivoted to position axle 148' at an angle ½D as shown in FIGURE 2.

Rotation of axle 148' causes the end portion A' to pivot on wheels 99'. As this pivotal movement occurs, the reverse of the operation described in connection with section A takes place. The gear 28' rotates relative to cone gears 32', as can be seen in FIGURE 4. The tow bar C' is held in a stationary position by means (not shown), and when so held, the gear 34' is also stationary. As cone gears 32' rotate relative to stationary gear 34', they pivot plate 36', arms 74' and axle 78' to a position where the axle 78' is at an angle D' relative to the normal 192', as shown in FIGURE 2. When the tow bar C' is employed to draw the first form of the device, the above described sequence of events is simply reversed.

The second form E of the invention is shown in FIGURES 8–15 inclusive, and is adapted to be used on either a highway or transported to a desired destination on rails. Form E of the vehicle, as can best be seen in FIGURE 15, includes first and second end sections F and F' that are pivotally connected to opposite ends of an intermediate section G. Each section F, F' and G is illustrated as having an enclosed structure 200 mounted thereon which protects the cargo (not shown) transported thereby. The structures 200 may be refrigerated, if desired, to protect perishable cargoes during transportation thereof.

The left-hand half of the vehicle E shown in FIGURE 15 is identical to the right-hand half thereof, and accordingly, only the left-hand half is illustrated in detail in FIGURES 8–12 inclusive.

The first section F includes a platform 201 which is of the same configuration as platform 10 previously described herein. A centrally disposed, longitudinally extending beam 202 is secured to the under side of platform 201. Beam 202 (FIGURE 8) continues to the right beyond platform 201 to develop into a portion 204 that defines a vertical opening 206. A number of reinforcing members 208 are connected to the end portions of beam 202 and the under side of platform 201 to define a diamond and rectangle, as can best be seen in plan view in FIGURE 9. The reinforcing members 208 can, of course, be arranged to define other geometrical patterns.

A first heavy circular plate 210 of steel or the like, is rigidly secured to the under side of the outer end portion of beam 202 and the parts of the reinforcing members 208 adjacent thereto. A rigid cylindrical member 212 depends from the under side of platform 201 through an opening 214 formed in a body 216. Body 216 is created by the merger of reinforcing members 208 with the left-hand end portion of beam 202, as seen in FIGURE 9. Member 212 also projects downwardly through a central opening formed in plate 210.

A first beveled gear 218 is secured to the under side of plate 210 which is engaged by two diametrically opposed cone gears 220. Gears 220 also engage a second beveled gear 222. A centrally disposed, vertically extending opening (not shown) is formed in gears 218 and 222 through which member 212 passes. Gear 222 is rotatable relative to member 212.

Each cone gear 220 is rotatably supported on a stub shaft 224 mounted on the upper end of an upright 226. Each upright 226 is secured to a second horizontal cirwith the end sections having couplings 351 mounted thereon for connection to adjoining couplings (not shown) in a train. Two laterally spaced ramps 352 are provided on opposite sides of rails 254, and are so spaced as to support the pneumatic-tired wheels of this vehicle. The second form E is run upon the ramps 352, and then moved to the left, as viewed in FIGURE 12, whereby the rigid members 212 removably engage the sockets 350 of the trucks 346 and support the device thereon, as illustrated in FIGURE 15. When a desired destination is reached, the pneumatic-tired wheels of the vehicle are caused to engage the ramp 352 and the device is moved to the right thereon (FIGURE 12), it is raised, and the members 212 and 278 and other members of a like nature (not shown) separated from the trucks 346. After separation of the device from the trucks 346, the trucks are moved to the right, and the second form E of the device is moved to the left from the ramps 352 to be drawn over the highways in the manner previously described.

Thus, the second form of the invention can be moved over the highways or over railway tracks to a desired destination, and then separated from the trucks 346 to complete the balance of the journey over the highways.

The tow bars C, C', H and H' can be removably held in fixed position relative to the vehicle of which they form a part by a horizontal lug 354 affixed to an end of a vehicle, and a bolt or other elongate rigid member 356 extended downwardly through a bore (not shown) in the lug to engage a bore (not shown) in the tow bar, as illustrated in FIGURE 4.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. An articulated cargo carrier, including:
  (a) first and second horizontal, longitudinally spaced end platforms having adjacently disposed concave edges;
  (b) an intermediate horizontal platform having convex curved edges interposed between said first and second platforms, which platforms define a substantially continuous cargo-supporting surface;
  (c) first, second and third pneumatic-tired wheel assemblies rigidly secured under said first and second end platforms and said intermediate platform at substantially the centers thereof;
  (d) first, second, third and fourth gear means, which first and second gear means are rigidly affixed to the under sides of said first and second platforms, respectively, adjacent the free ends thereof, with said third and fourth gear means being affixed to the under side of said intermediate platform adjacent said convex ends thereof;
  (e) first, second, third and fourth elongate stud bolts that project downwardly from the centers of said first, second, third and fourth gear means;
  (f) fifth, sixth, seventh and eighth gear means rotatably supported on said stud bolts below said first, second, third and fourth gear means;
  (g) first, second, third and fourth gears disposed between said first, second, third and fourth gear means and said fifth, sixth, seventh and eighth gear means in toothed engagement therewith;
  (h) first, second, third and fourth horizontal plates rotatably supported on said first, second, third and fourth stud bolts below said fifth, sixth, seventh and eighth gear means;
  (i) first, second, third and fourth uprights secured to said first, second, third and fourth plates, that rotatably support said first, second, third and fourth gears;
  (j) fourth and fifth pneumatic-tired wheel assemblies rigidly secured under said first and second plates;
  (k) sixth and seventh pneumatic-tired wheel assemblies disposed under said third and fourth plates and rotatably supported on said third and fourth stud bolts;
  (l) a first tow bar projecting from the free end of said first end platform and rigidly connected to said fifth gear means, which first tow bar when pulled and moved sidewise pivots said fifth gear means relative to said first gear to rotate the same, with said first gear as it rotates moving relative to said first gear means to pivot said first plate and fourth wheel assembly in the direction in which said sidewise force is applied to said first tow bar to urge said first end platform to pivot on said first wheel assembly to a first angle relative to said intermediate platform as said carrier is drawn in the direction in which said first tow bar projects from said first end platform;
  (m) first and second means operated by rotation of said third and fourth gear means relative to said third and fourth gears as said intermediate platform pivots on said third wheel assembly to follow said first end platform for pivoting said sixth and seventh wheel assemblies to second angles that are substantially one-half of said first angle, at which second angles said sixth and seventh wheel assemblies track with said fourth wheel assembly, with said intermediate platform as it so pivots forcing said second end platform to pivot on said second wheel assembly, and with said second gear means as said second platform so pivots moving relative to said second gear to rotate the same, which second gear as it moves relative to said sixth gear means pivots said second plate and fifth wheel assembly to said first angle where said fifth wheel assembly tracks with said fourth wheel assembly;
  (n) third means for holding said sixth gear means in a non-rotatable position relative to said second end platform;
  (o) a plurality of longitudinally extending tow bar members under said platforms that are pivotally connected to said stud bolts; and
  (p) fourth means for pivotally connecting said first tow bar to said first stud bolt to permit transfer of the drawing force exerted on said first tow bar throughout the length of said vehicle only by said tow bar members.

2. A cargo carrier as defined in claim 1 which further includes:
  (q) fifth means for transferring the weight of said first and second platforms and said intermediate platform and any cargo thereon to said first, second, third and fourth plates without subjecting said first, second, third and fourth gears thereto.

3. A cargo carrier as defined in claim 1 which further includes:
  (q) first, second, third and fourth outer rings disposed under said platforms that encircle said first, second, third and fourth gear means;
  (r) first, second, third and fourth inner rings disposed within the confines of said first, second, third and fourth outer rings and separated therefrom;
  (s) a plurality of horizontal circular webs connecting each of said outer rings to said inner ring most adjacent thereto;
  (t) a plurality of first rollers resting on the upper surface of each of said webs and rotatably engaging the under surface of that one of said platforms most adjacent thereto; and
  (u) a plurality of second rollers resting on the upper surfaces of said plates and rotatably engaging the under surface of that one of said webs most adjacent thereto, with said first and second rollers and said webs cooperatively transferring the weight of said platforms and any cargo thereon to said plates without subjecting said first, second, third and fourth gears thereto.

4. A cargo carrier as defined in claim 1 wherein said first, second, third and fourth gear means comprise beveled gears, which first, second, third and fourth gears comprise cone gears, and said fifth, sixth, seventh and eighth gear means comprise beveled gears.

5. A cargo carrier as defined in claim 1 wherein said first and second means include:
 (q) first and second doubled-over horizontal endless belts disposed under said intermediate platform adjacent said seventh and eighth gear means, with each of said belts including first and second reaches which are in spaced relationship;
 (r) a plurality of rotatable members which rotatably support said belts at a fixed distance below said intermediate platform;
 (s) two first arms rigidly connected to said third and fourth plates and said first reaches of said first and second belts; and
 (t) two second arms rigidly connected to said sixth and seventh wheel assemblies and to said second reaches of said first and second belts.

6. A cargo carrier as defined in claim 1 wherein said third means includes:
 (q) a second tow bar affixed to said sixth gear means that extends outwardly from said second end platform in a direction opposite from that from which said first tow bar extends from said first end platform, which second bar is adapted for use in drawing said carrier in the direction in which it projects therefrom; and
 (r) a rigid member movably supported from said second end platform for holding said second tow bar in a stationary position when said second tow bar is not being used to tow said carrier.

7. An articulated cargo carrier capable of traveling on the ground or being moved over rails on railway trucks having sockets defined therein, including:
 (a) first and second horizontal, longitudinally spaced end platforms having adjacently disposed concave edges;
 (b) an intermediate horizontal platform having convex curved edges interposed between said first and second platforms, which platforms define a substantially continuous cargo-supporting surface;
 (c) first, second and third pneumatic-tired wheel assemblies rigidly secured under said first and second end platforms and said intermediate platform at substantially the centers thereof;
 (d) first, second, third and fourth gear means, which first and second gear means are rigidly affixed to the under sides of said first and second platforms respectively, adjacent the free ends thereof, with said third and fourth gear means being affixed to the under side of said intermediate platform adjacent said convex ends thereof;
 (e) first, second, third and fourth cylindrical members projecting downwardly from the center of said first, second, third and fourth gear means, which members are capable of pivotally engaging said sockets of said trucks to support said carrier for movement on said rails;
 (f) fifth, sixth, seventh and eighth gear means rotatably supported on said cylindrical members below said first, second, third and fourth gear means;
 (g) first, second, third and fourth gears disposed between said first, second, third and fourth gear means, and said fifth, sixth, seventh and eighth gear means, in toothed engagement therewith;
 (h) first, second, third and fourth horizontal plates rotatably supported on said first, second, third and fourth stud bolts below said fifth, sixth, seventh and eighth gear means;
 (i) first, second, third and fourth uprights secured to said first, second, third and fourth plates that rotatably support said first, second, third and fourth gears;
 (j) fourth and fifth pneumatic-tired wheel assemblies disposed under said first and second plates and rigidly secured thereto;
 (k) sixth and seventh pneumatic-tired wheel assemblies disposed under said third and fourth plates and rotatably supported on said third and fourth stud bolts;
 (l) a first tow bar that projects from the free end of said first end platform and is rigidly connected to said fifth gear means, which first tow bar when pulled and moved sidewise pivots said fifth gear means relative to said first gear to rotate the same, with said first gear as it rotates moving relative to said first gear means to pivot said first plate and fourth wheel assembly in the direction in which said sidewise force is applied to said first tow bar to urge said first end platform to pivot on said first wheel assembly to a first angle relative to said intermediate platform as said carrier is drawn in the direction in which said first tow bar projects from said first end platform;
 (m) first and second means operated by rotation of said third and fourth gear means relative to said third and fourth gears as said intermediate platform pivots on said third wheel assembly to follow said first end platform to pivot said sixth and seventh wheel assemblies to second angles that are substantially one-half of said first angle and at which said second angles said sixth and seventh wheel assemblies track with said fourth wheel assembly, with said intermediate platform as it so pivots forcing said second end platform to pivot on said second wheel assembly, with said second means as said second platform so pivots moving relative to said second gear to rotate the same, and said second gear as it moves relative to said sixth gear means pivoting said second plate and fifth wheel assembly to said first angle where said fifth wheel assembly tracks with said fourth wheel assembly;
 (n) third means for holding said sixth gear means in a non-rotatable position relative to said second end platform;
 (o) a plurality of longitudinally extending beams under said platforms that are pivotally connected to said cylindrical members; and
 (p) fourth means for pivotally connecting said first tow bar to said first cylindrical member to transfer the drawing force exerted on said first tow bar throughout the length of said vehicle only by said beams.

8. A cargo carrier as defined in claim 7 which further includes:
 (q) fifth means for transferring the weight of said first and second platforms and said intermediate platform and any cargo thereon to said first, second, third and fourth plates without subjecting said first, second, third and fourth gears thereto.

9. A cargo carrier as defined in claim 7 which further includes:
 (q) first, second, third and fourth outer rings disposed under said platforms that encircle said first, second, third and fourth gear means;
 (r) first, second, third and fourth innner rings disposed within the confines of said first, second, third and fourth outer rings and separated therefrom;
 (s) a plurality of horizontol circular webs connecting each of said outer rings to said inner ring most adjacent thereto;
 (t) a plurality of first rollers resting on the upper surface of each of said webs and rotatably engaging the under surface of that one of said platforms most adjacent thereto; and (u) a plurality of second rollers resting on the upper surfaces of said plates and rotatably engaging the under surface of that one of said webs most adjacent thereto, with said first and second rollers and said webs cooperatively transferring the weight of said platforms and any cargo thereon to said plates without subjecting said first, second, third and fourth gears thereto.

10. A cargo carrier as defined in claim 7 wherein said first, second, third and fourth gear means comprise beveled gears, which first, second, third and fourth gears comprise cone gears, and said fifth, sixth, seventh and eighth gear means comprise beveled gears.

11. A cargo carrier as defined in claim 7 wherein said third means includes:
(q) a second tow bar affixed to said sixth gear means that extends outwardly from said second end platform in a direction opposite that from which said first tow bar extends from said first end platform, which second bar is adapted for use in drawing said carrier in the direction in which it projects therefrom; and
(r) a rigid member movably supported from said second end platform for holding said second tow bar in a stationary position when said second tow bar is not being used to tow said carrier.

References Cited by the Examiner
UNITED STATES PATENTS

| | | | |
|---|---|---|---|
| 1,416,613 | 5/1922 | Collardeau | 280—442 X |
| 3,185,108 | 5/1965 | Muller | 105—3 |

FOREIGN PATENTS

| | | |
|---|---|---|
| 660,099 | 3/1963 | Canada. |
| 348,604 | 2/1905 | France. |
| 24,232 | 1905 | Great Britain. |

LEO FRIAGLIA, *Primary Examiner*